(12) United States Patent
Kim et al.

(10) Patent No.: US 6,217,264 B1
(45) Date of Patent: Apr. 17, 2001

(54) CUTTING INSERT HAVING AN IMPROVED CHIP BREAKER

(75) Inventors: Kyung Bae Kim; Hak Kyu Kim; Young Heum Kim, all of Chungcheongbuk-Do; Wook Jung Sung, Kyongsangbuk-Do; Kwan Hee Lee, Chungcheongbuk-Do, all of (KR)

(73) Assignee: Korloy, Inc. (KR)

( * ) Notice: Subject to any disclaimer, the term of this patent is extended or adjusted under 35 U.S.C. 154(b) by 0 days.

(21) Appl. No.: 09/528,317

(22) Filed: Mar. 20, 2000

Related U.S. Application Data (63) Continuation-in-part of application No. 09/203,122, filed on Dec. 1, 1998, now abandoned.

(30) Foreign Application Priority Data

May 30, 1998 (KR) .................................................. 98-20754

(51) Int. Cl.[7] .................................................. B23B 27/22
(52) U.S. Cl. .......................... 407/114; 407/116; 407/115
(58) Field of Search .................................... 407/113, 114, 407/115, 116, 120, 100

(56) References Cited

U.S. PATENT DOCUMENTS

| | | | |
|---|---|---|---|
| 4,629,372 | * | 12/1986 | Huston ................................. 407/116 |
| 5,180,258 | * | 1/1993 | Bernadic ............................... 407/114 |
| 5,525,016 | * | 6/1996 | Paya et al. ............................ 407/116 |
| 5,772,366 | * | 6/1998 | Wilman et al. ................... 407/114 X |
| 5,810,520 | * | 9/1998 | Hintze et al. ......................... 407/114 |

\* cited by examiner

Primary Examiner—Henry Tsai
(74) Attorney, Agent, or Firm—Omri M. Behr (57) ABSTRACT

Disclosed is a cutting insert capable of enhancing the surface roughness of worked materials and lengthening the durability of a cutting tool which has utilized in conjunction with the cutting insert, capable of efficiently removing cut chips from the cutting region by making a chip breaker into a complete free curved surface to discharge the cut chips in the most natural direction and form, which are formed when performing a desired cutting operation of ferrous or nonferrous metals such as aluminum, copper, stainless, etc., to also minimize the resistance to chip flow and the occurrence of the melted-sticking phenomenon. The cutting insert has a specific chip breaker formed on an upper surface thereof with the aid of a pressure molding operation using a mold and in a sintering operation. A lower surface of the cutting insert is formed as a plane. The lower surface is firmly fixed on a holder for cutting tool and supports the cutting insert when mounting the cutting insert in the holder for cutting tool. It is also possible to provide the chip breaker on the lower surface. At least one cutting corner is formed at corners of the upper surface. The cutting insert includes main cutting edge portions slanted to the cutting corner at a certain angle. The main cutting edge portions includes main cutting edges and main cutting edge land surfaces extend from the main cutting edges toward the upper surface. A circle opening is formed through the center of the cutting insert. A boss is mounted in the circle opening.

14 Claims, 7 Drawing Sheets

CUTTING INSERT HAVING AN IMPROVED CHIP BREAKER

CROSS REFERENCE TO RELATED APPLICATION

This application is a continuation-in-part of U.S. Ser. No. 09/203,122 filed Dec. 1, 1998, now abandoned.

BACKGROUND OF THE INVENTION

1. Field of the Invention

The present invention relates to a cutting insert, and more particularly to a cutting insert capable of enhancing the surface finish of worked materials and lengthening the durability of a cutting tool which has utilized in conjunction with the cutting insert, capable of efficiently removing cut chips from the cutting region by making a chip breaker into a complete non uniform curved surface to flow the cut chips in the most natural direction and curling, which are formed when performing a desired cutting operation, to also minimize the resistance to chip flow and the occurrence of the adhesion phenomenon.

2. Description of the Related Art

The machine industry such as the automotive industry etc. has been well developed heretofore, and thereby a variety of manufacturing processes have been automatized and performed at high speed. As a result, there exists a need for enhancing the performance of the cutting tool and for lengthening the durability of the cutting tool which has been well utilized in the machine industry.

The cutting tool is mainly used to cut ferrous or nonferrous metals under the state that it is mounted in a machine tool. The processes of cutting the metals using the cutting tool can be classified into two ways. According to the first way, the cutting tool cuts a metal workpiece under the state that an edge of cutting tool is brought into contact with a surface of the metal workpiece when rotating the workpiece, According to the second way, a cutting insert having a cutting edge cuts a metal workpiece, which is fixed at a predetermined position on a work station, when rotating the cutting insert under the state that the cutting insert is mounted in a machine tool using a holder for cutting tool.

The cutting insert is used to cut the workpiece under the state that it is mounted to a portion of the cutting tool directly contacting with the workpiece. The cutting insert is the most important factor in a metal cutting process. Further, the quality and the shape of the cutting insert is the most important factor for determining the durability of the cutting tool and the quality of the worked materials.

However, in the metal cutting process using the cutting insert, it is the most important things that metal chips generated from the workpiece, in the form of chip, when cutting unessential portions of the workpiece are securely and effectively flowed from the cutting region. Accordingly, a variety of endeavors for developing a cutting insert capable of securely flowing the metal chips from the cutting region without interfering with the continuing cutting process and without endangering the operating personnel have been proposed.

As a part of the endeavors, a method of changing the shape of the cutting insert for effectively cutting the workpiece has been proposed. Generally, the cutting insert has a rake surface and a flank surface. The rake surface allows the cut chips for flowing. An angle and a shape of the rake surface play an important role in determining the durability of the cutting insert, the surface finish of worked materials, a chip breaking, cut chip flowing and a cutting resistance, etc. The specific shape of the sloping surface and the surplus surface is called as "chip breaker". Chip breakers having a variety of shapes have been developed heretofore in the field of the art with respect to manufacturing the cutting insert. A standard of developing the chip breaker in relation to the shape thereof is the quality of the workpiece, the shape of the workpiece, a size of the cut portion of the workpiece, a precision of the cutting process, the quality of the cutting tool, etc.

However, according to the prior art, since a predetermined angle is present between a rake surface and a certain plane, a unnatural cutting phenomenon, which is not associated with a natural cutting mechanism proceed in the metal cutting process, can be generated. Due to this phenomenon, the cutting resistance is increased when cutting the workpiece. Further, the workpiece can be melted and stuck to the cutting edge of the cutting tool at the time that the workpiece begins to be melt. In addition, there are many problems such that the badness of the chip breaking, the excess wear of the cutting tool, the chipping of the cutting edge, the breakdown of the cutting tool, etc.

Figure 11A:
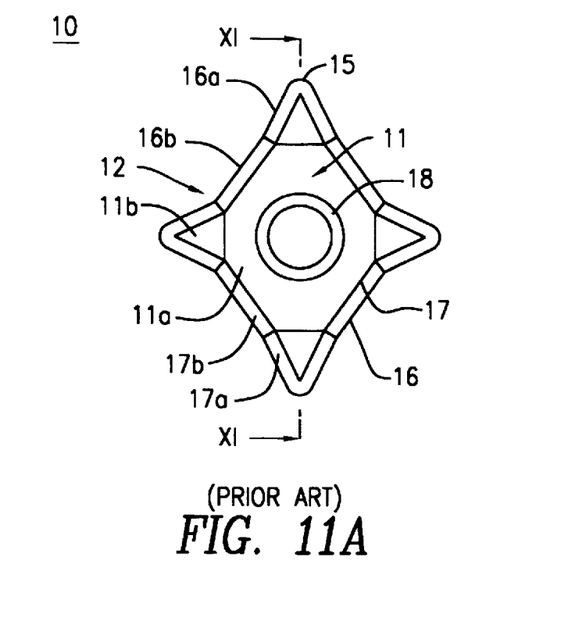
FIG. 11A is a top view of a cutting insert according to the prior art.
Figure 11B:
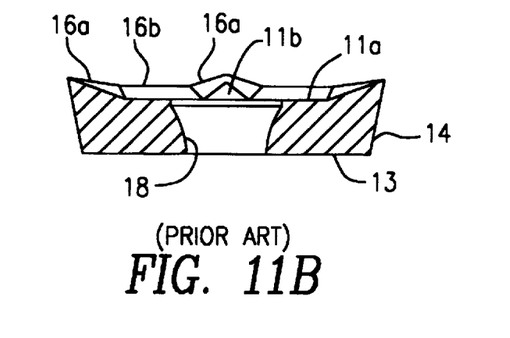
FIG. 11B is a sectional view taken along the line XI—XI of FIG. 11A.

FIG. 11A is a top view of a cutting insert according to the prior art, and FIG. 11B is a sectional view taken along the line XI—XI of FIG. 11A.

Referring to FIGS. 11A and 11B, a cutting insert 10 according to the prior art includes a main body 12 having substantially parallel an upper surface 11 and a bottom surface 13. A circle opening 18 is formed through the center of the main body 12. Circle opening 18 provides a means whereby a holder for cutting tool (not shown) can be fitted into circle opening 18 to secure cutting insert 10 to the holder for cutting tool.

Cutting insert 10 includes four cutting corners 15. Two cutting edges 16 and two chip grooves 17 adjacent to the cutting edges 16 extend from cutting corners 15. Cutting edges 16 extend from cutting corners 15 to the middle portion of cutting edges 16 at a predetermined angle. Cutting edges 16 comprise a straight sloping portion 16a and a horizontal center portion 16b, respectively.

Straight sloping portions 16a of cutting edges 16 vary in width, widening from cutting corners 15 to the middle portion of cutting edges 16.

Chip grooves 17 continuously extend across sections of cutting corners 15 and sections adjacent to straight sloping portions 16a. Chip grooves 17 are provided with sloping side surfaces 17a,17b. Sloping side surfaces 17a,17b uniformly maintain in width at the center portions 16b of cutting edges 16. Sloping side surfaces 17a,17b and upper surface 11 of cutting insert 10 form an angle greater than 130°.

Upper surface 11 includes a flat horizontal section 11a and flat triangular sections 11b. Flat triangular sections 11b form a predetermined angle with flat horizontal section 11a. Flat horizontal section 11a meets with sloping side surfaces 17a,17b of chip grooves 17 in an adjoining relationship and accordingly form an angle therebetween. The altitude of flat horizontal section 11a is lower than that of cutting edge 16.

However, in cutting insert 10 as described above, sloping side surfaces 17a,17b of the chip breaker allowing the cut chips to flow there through are plane in figure. Further, the common junctures between flat horizontal section 11a and flat triangular sections 11b, sloping side surface 17a and flat triangular section 11b, sloping side surface 17b and flat horizontal section 11a, etc. form an angle therebetween. Accordingly, the cut scraps produced during the metal cutting process undergo compulsive bending stresses while passing through the planes such as sloping side surfaces 17a,17b and the common junctures. As a result, the irregular and excess stresses can be applied to cutting edge 16 playing an important role in the cutting process, and thereby the cut chips are melted and stuck to cutting edge 16. Further, the cut chips cannot smoothly and securely flowed from the cutting region, and the surface finish of worked materials is not good. In addition, the chipping of the cutting edge can be generated. Consequently, the cutting tool has a short life.

U.S. Pat. No. 5,772,366 issued to Jorgen Wiman et al on Jun. 30, 1998 discloses a cutting insert having an integral chip control surface. In this patent, the cutting insert comprises a compound body consisting of a sintered cemented carbide substrate with a surface coating which is a diamond coating with a thickness of 1~20 μm deposited directly from a gas phase in a reactor by CVD or PVD technique. Therefore, it is necessary to perform any post-processing for a plurality of curved projections and an integral chipformer provided on an upper surface of the cutting insert.

However, in the Wiman al.'s invention, since a central portion of an upper surface of the cutting insert is perpendicular to acute-angled corners of the cutting insert, there is no chip breakers in a direction parallel with a corner cutting edge. Accordingly, the resistance to chip flow is relatively high. Since an acute-angled angle is in existence at the juncture between the central portion and a sloping flank on the upper surface of the cutting insert, the cutting resistance to the cutting edges is increased and therefore the built-up edge phenomenon frequently generates at the cutting edges. If a workpiece to be cut has a sharp-shaped outer surface, the separation of the thin film of the workpiece can be generated on the outer surface and thereby the surface finish of the workpiece is not good. Consequently, it is impossible to maintain pointed cutting edges during the workpiece of aluminum cutting process.

SUMMARY OF THE INVENTION

The present invention is contrived to solve the foregoing problems. It is an object of the present invention to provide a cutting insert capable of enhancing the surface finish of worked materials and lengthening the durability of a cutting tool life which has utilized in conjunction with the cutting insert, capable of efficiently removing cut chips from the cutting region by making a chip breaker into a non uniform curved surface to flow the cut chips in the most natural direction and form, which are formed when performing a desired cutting operation of ferrous or nonferrous metals such as aluminum, copper, stainless, etc., to also minimize the resistance to chip flow and the occurrence of the melted-sticking phenomenon.

In order to achieve the above object, the present invention provides a cutting insert, comprising:

an upper surface having a chip breaker formed in a pressure molding operation using a mold and in a sintering operation, the upper surface including at least one ridge and valley constituting a non uniform curved surface;

a lower surface formed as a plane, the lower surface being firmly fixed on a holder for cutting tool and supporting the cutting insert when mounting the cutting insert in the holder for cutting tool;

at least one corner cutting edge portion formed at corners of the cutting insert, the corner cutting edge portion extending from a first side face of the cutting insert, a curved surface of the corner cutting edge portion comprising a corner cutting edge, a curved corner cutting edge land surface, a curved corner chip groove and a curved surface extending from a first valley closed by a curved surface of the corner chip groove to an apex of a first ridge neighboring to the first valley, in which a center of the curved surface of the corner cutting edge portion is projected on a plane along a bisecting line going from a center of the corner cutting edge toward a center of an opening formed through a center portion of the cutting insert, and a radius of curvature of a curved surface of the corner cutting edge land surface is within the range of from 1 to 30 mm; and main cutting edge portions including sloping main cutting edge land surfaces extending downwards from main cutting edges of the main cutting edge portions toward the bisecting line, the main cutting edges meeting with the corner cutting edge in an adjoining relationship and forming a corner included angle of between 35° and 180° therebetween, in which the main cutting edge land surfaces comprise at least one curved surface extending from a second side face of the cutting insert and connecting the ridge and the valley with each other, a radius of curvature of a curved surface comprising the main cutting edge land surfaces and the ridge or comprising the main cutting edge land surfaces and the valley is within the range of from 5 to 15 mm, the main cutting edges comprises at least one curved line and at least one straight line which smoothly meet with each other in an adjoining relationship, the curved line extends downwards from the corner cutting edge toward the center portion of the cutting insert, and a radius of curvature of the curved line is within the range of from 3 to 20 mm.

Further, the present invention provides a cutting insert, comprising:

an upper surface having a first chip breaker formed in a pressure molding operation using a mold and in a sintering operation, the upper surface including at least one ridge and valley constituting a non uniform curved surface;

a lower surface having a second chip breaker formed in a pressure molding operation using a mold and in a sintering operation, the second chip breaker being mirror symmetrical with respect to the first chip breaker along a horizontal bisector of the cutting insert, the lower surface including at least one ridge and valley constituting a non uniform curved surface;

at least one corner cutting edge portion formed at corners of the cutting insert, the corner cutting edge portion extending from a first side face of the cutting insert, a curved surface of the corner cutting edge portion comprising a corner cutting edge, a curved corner cutting edge land surface, a curved corner chip groove and a curved surface extending from a first valley closed by a curved surface of the corner chip groove to an apex of a first ridge neighboring to the first valley, in which a center of the curved surface of the corner cutting edge portion is projected on a plane along a bisecting line going from a center of the corner cutting edge toward a center of an opening formed through a center portion of the cutting insert, and a radius of curvature of a curved surface of the corner cutting edge land surface is within the range of from 1 to 30 mm; and main cutting edge portions including sloping main cutting edge land surfaces extending downwards from main cutting edges of the main cutting edge portions toward the bisecting line, the main cutting edges meeting with the corner cutting edge in an adjoining relationship and forming a corner included angle of between 35° and 180° therebetween, in which the main cutting edge land surfaces comprise at least one curved surface extending from a second side face of the cutting insert and connecting the ridge and the valley with each other, a radius of curvature of a curved surface comprising the main cutting edge land surfaces and the ridge or comprising the main cutting edge land surfaces and the valley is within the range of from 5 to 15 mm, the main cutting edges comprises at least one curved line and at least one straight line which smoothly meet with each other in an adjoining relationship, the curved line extends downwards from the corner cutting edge toward the center portion of the cutting insert, and a radius of curvature of the curved line is within the range of from 3 to 20 mm.

BRIEF DESCRIPTION OF THE DRAWINGS

The above object and other characteristics and advantages of the present invention will become more apparent by describing in detail preferred embodiments thereof with reference to the attached drawings, in which.

DETAILED DESCRIPTION OF THE INVENTION

Generally, the important factors of determining the performance of the cutting insert are the shapes of a main cutting edge, a cutting corner and an auxiliary cutting edge. More particularly, the ends, the land surfaces or the chip grooves of the cutting edge are very important in the cutting process with regard to the work materials of aluminum, copper, stainless steel, etc. Since the cutting process of soft materials such as aluminum is performed at a high speed and the cut chips are flowed along sloping surfaces, the chip grooves, an upper surface of the cutting insert, then the shape of the upper surface, which is positioned at the downstream in the direction of chip flowing, also plays an important role in the cutting process. Therefore, this invention is contrived to improve the shape of the chip breaker which is an important factor in the cutting mechanism.

The cutting insert according to the present invention is formed by depositing a hard coating layer onto the surface of substrate of the cutting tool or the wear resistance tool. For example, in order to produce the cutting insert, the powder materials such a cemented carbide of tungsten carbides, a various kinds of cement alloys of titanium carbides, a ceramic, a steel such as a high speed steel, etc., undergo the molding and the sintering process. As a result, a sintered body is produced. The sintered body passes through the grinding, polishing, cleaning process. Thereafter, in order to give the wear resistance and the heat shock resistance to the sintered body, at least one layer of materials selected from the group consisting of carbides, nitrides, carbo-nitrides of titanium(Ti), zirconium(Zr) or hafnium(Hf) which are the IV-A group metals, and aluminum oxides are deposited on the surface of the sintered body by using PVD or CVD. As a result, the cutting insert having improved hot hardness and oxidation resistance can be produced.

Hereinafter, preferred embodiments of the present invention will be explained in more detail with reference to the accompanying drawings.

Figure 1:
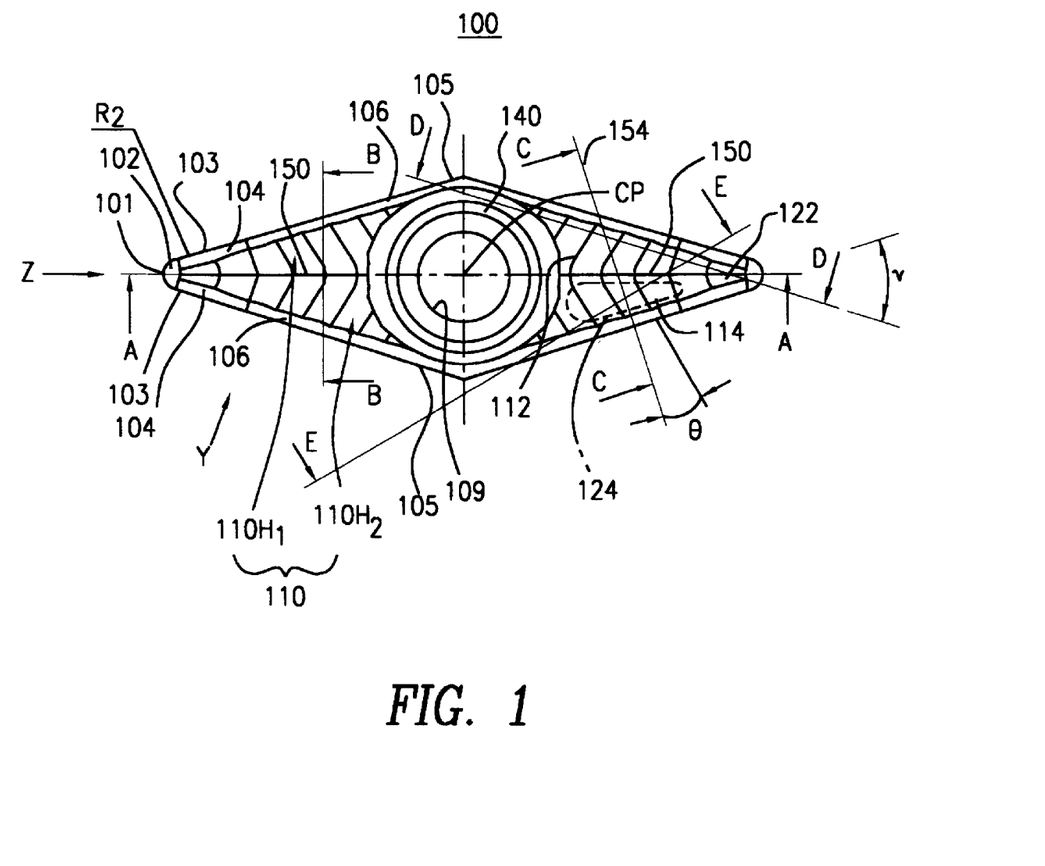
FIG. 1 is a top view of a cutting insert according to a preferred first embodiment of the present invention.
Figure 1A:
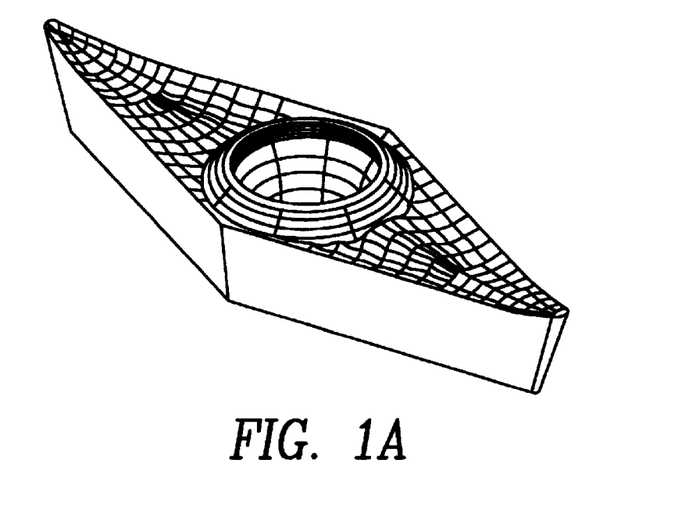
FIGS. 1A and 1B are three-dimensional perspective views of the cutting insert shown in FIG. 1.
Figure 1B:
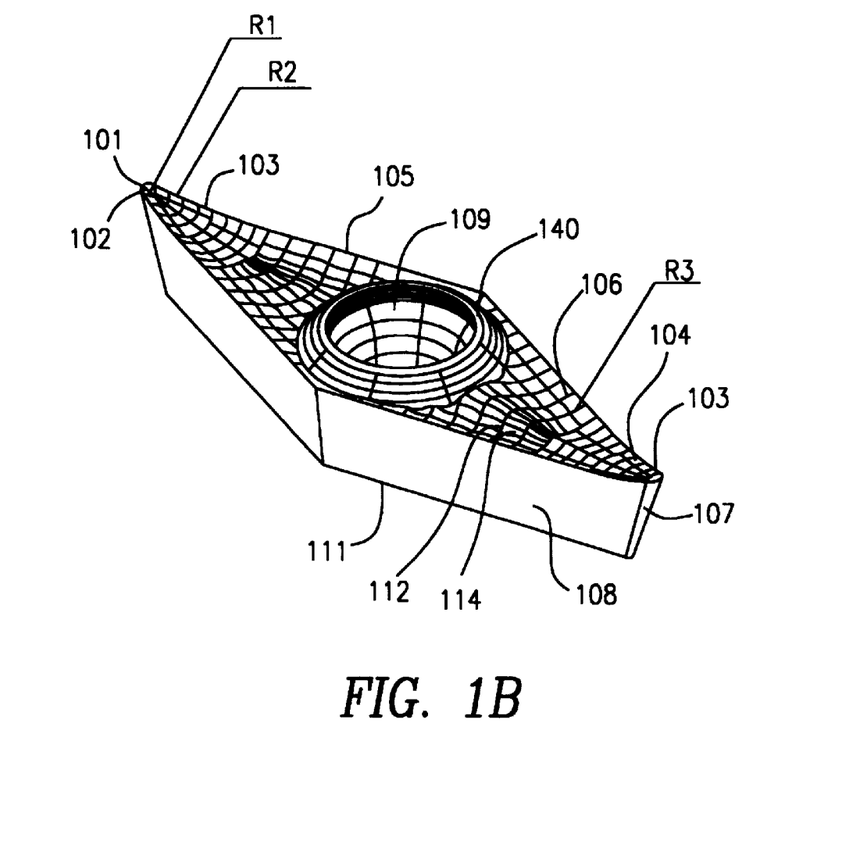
Figure 2A:
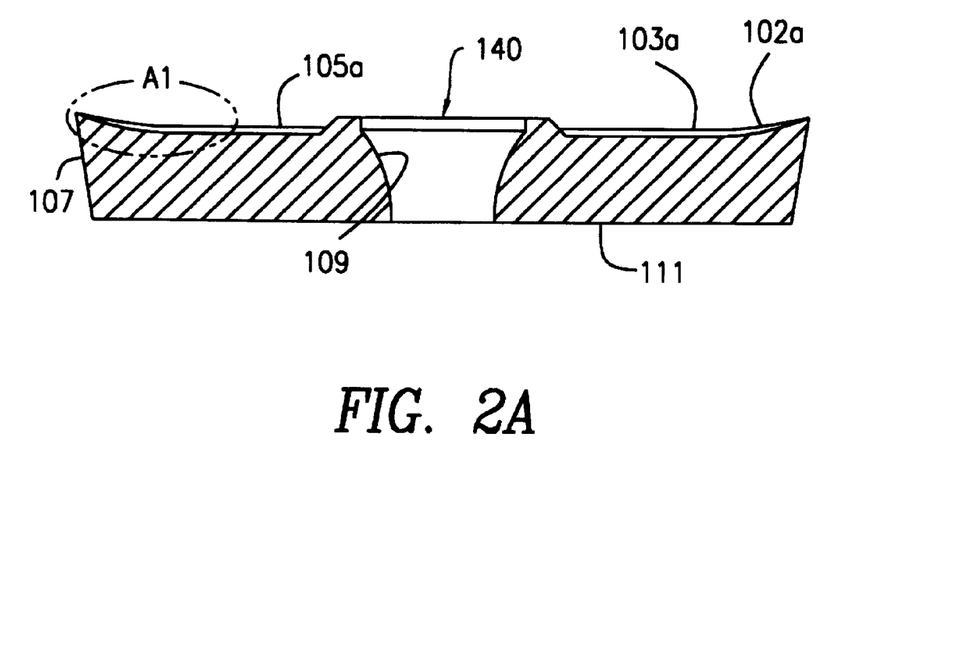
FIG. 2A is a sectional view taken along the line A—A of FIG. 1.

FIG. 1 is a top view of a cutting insert according to a preferred first embodiment of the present invention, FIGS. 1A and 1B are three-dimensional perspective views of the cutting insert shown in FIG. 1. FIG. 2A is a sectional view taken along the line A—A of FIG. 1, and FIG. 2B is an enlarged view of "A" section illustrated in FIG. 2A.

Figure 2B:
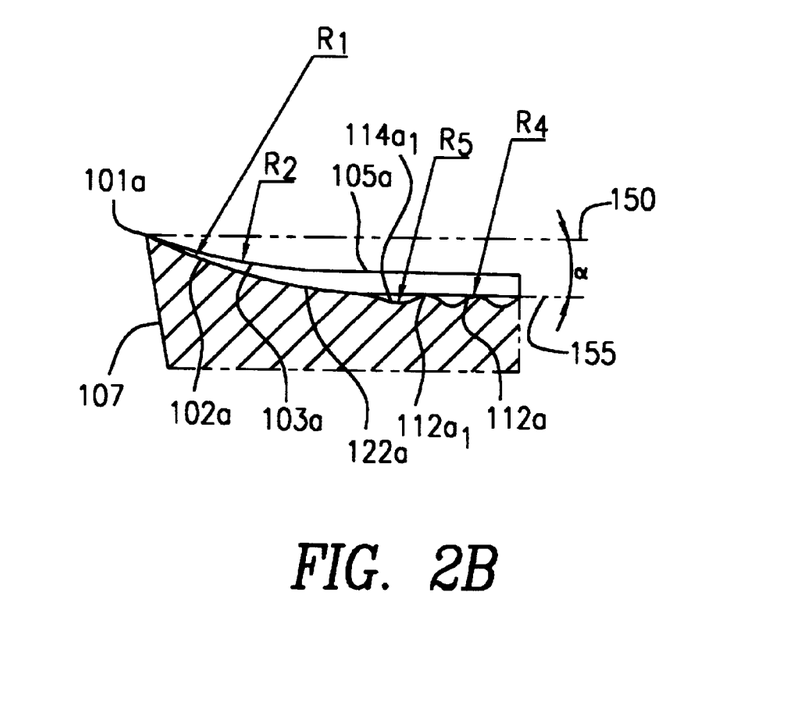
FIG. 2B is an enlarged view of "A" section illustrated in FIG. 2A.

Referring to FIGS. 1 to 2B, cutting insert 100 cuts ferrous or nonferrous metals by only using an upper surface 110 thereof. Accordingly, a chip breaker is only provided on upper surface 110. A lower surface 111 is a plane in figure and thereby it can be firmly fitted into a holder for cutting tool (not shown) during the installation of cutting insert 100 into the holder for cutting tool. Lower surface 111 firmly supports cutting insert 100 within the holder for cutting tool. The chip breaker of upper surface 110 is created in a pressing molding operation using a mold and in a sintering operation. Accordingly, there is no necessity for performing any post-processing to the chip breaker portion.

The V-type of cutting insert 100 includes at least one corner cutting edge portion formed at corners of cutting insert 100. As best seen in FIG. 2B, a curved surface of the corner cutting edge portion comprises a corner cutting edge 101a, a curved corner cutting edge land surface 102a, a curved corner chip groove 122a and a curved surface extending from a first valley $114a_1$, closed by a curved surface 122a to an apex of a first ridge $112a_1$ neighboring to first valley $114a_1$. At this time, a radius of curvature ($R_1$) of corner cutting edge land surface 102a is within the range of from 1 to 30 mm. Further, a radius of curvature($R_4$) of ridge $112a_1$ and a radius of curvature($R_5$) of valley $114a_1$ are within the range of from 0.1 to 2.5 mm.

Meanwhile, a center of the curved surface of corner cutting edge portion is projected on a plane along bisecting line 150 going from a center of corner cutting edge 101 toward a center(CP) of an opening 109 which is formed through a center portion of cutting insert 100. At this time, bisecting line 150 divides upper surface 110 into a first region 110H₁ and a second region 110H₂ so that first region 110H₁ is mirror symmetrical with respect to second region 110H₂ along bisecting line 150.

As best seen in FIG. 2B, bisecting line 150 is parallel with lower surface 111. A tangential line 155 connecting ridges 112a₁, 112a with each other determines a curling radius of the cut chips produced during the ferrous or nonferrous metal cutting process. Further, tangential line 155 determines a radius of curvature of at least one chip groove 124 and a flowing direction of the cut chips. Tangential line 155 and bisecting line 150 form a predetermined angle(α), preferably −10° to +10° therebetween. The angle(α) depends on an included angle(γ) of inclination of corner cutting edge 101.

Corner cutting edge 101 extends from a first side face 107 of cutting insert 100. At this time, first side face 107 extends upwardly and slants outwardly from lower surface 111 to corner cutting edge 101 so that the interference between corner cutting edge 101 and the workpiece is obviated.

Referring to now to FIG. 1, cutting insert 100 includes main cutting edge portions comprising main cutting edges 103,105 and sloping main cutting edge land surfaces 104, 106. The main cutting edge land surfaces 104,106 extend downwards from main cutting edges 103,105 toward bisecting line (150).

Main cutting edges 103 and 105 merge with each other and constitute a natural curved surface. Although radius of curvature (R₂) of main cutting edges 103,105 depends on the size of cutting insert 100, it is within the range of from 3 to 20 mm.

Main cutting edges 103 and 105 smoothly meet with corner cutting edge 101 in an adjoining relationship. A corner included angle(γ) of 35° is formed between main cutting edges 103,105 and corner cutting edge 101.

Alternatively, in case of the R-type cutting insert, the corner included angle(γ) of 180° is formed therebetween. In case of the C-type cutting insert, the corner included angle (γ) is 80°. In case of the T-type cutting insert, the corner included angle (γ) is 60°. In case of the D-type cutting insert, the corner included angle (γ) is 55°. Finally, in case of the S-type cutting insert, the corner included angle (γ) is 90°.

Figure 3:
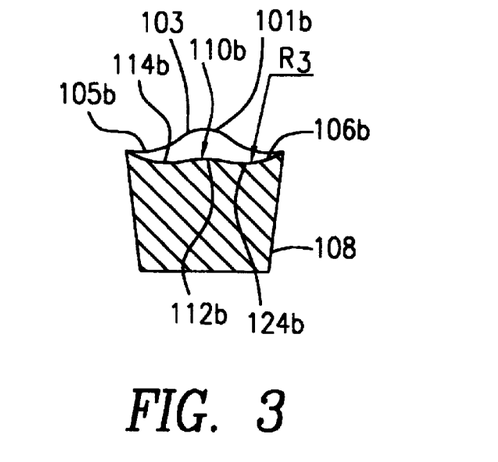
FIG. 3 is a sectional view taken along the line B—B of FIG. 1.

Main cutting edge land surfaces 104,106 comprise at least one curved surface extending from a second side surface 108(referred to FIG. 3). Cut chips produced during the ferrous or nonferrous metal cutting process meet with main cutting edge land surfaces 104,106 at first. Accordingly, main cutting edge land surfaces 104,106 are formed as smooth non uniform curved surfaces in order to reduce resistance to chip flow. As a result, the wear resistance and the surface finish of the worked materials are enhanced.

Upper surface 110 of cutting insert 100 not undergoes in the grinding process. Alternatively, upper surface 110 undergoes in the pre-honing process, buffing process or surface hardening process. The altitude of upper surface 110 is lower than those of corner cutting edge 101 and main cutting edges 103,105. In the same manner as that of main cutting land surfaces 104,106, upper surface 110 is formed as a non uniform curved surface in order to reduce the resistance to chip flow. For this purpose, at least one ridge 112 and valley 114 are formed on upper surface 110, and thereby at least one corner chip groove 122 and a plurality of central grooves 124 are formed on upper surface 110. At this time, radius of curvature of ridge 112 and valley 114 are within the range of from 0.1 to 2.5 mm.

Referring to FIGS. 1 and 3, a curved surface, which is consisted of main cutting edge land surfaces 104,106 and ridge 112 or consisted of main cutting edge land surfaces 104,106 and valley 114, has a radius of curvature (R₃) within the range of from 1 to 50 mm, preferably from 5 to 15 mm. The recessed chip grooves 122,124 extend from main cutting edge land surfaces 104,106 toward bisecting line 150. Chip grooves 122,124 are non uniform curved surfaces in figure so that the capability of removing the cut chips produced during the ferrous or nonferrous metal cutting process is enhanced.

A circle opening 109 is formed through the center of cutting insert 100 and a boss 140 is installed in circle opening 109. Boss 140 provides a means whereby a holder for cutting tool (not shown) can be fitted into boss 140 to secure cutting insert 100 to the holder for cutting tool. The altitude of boss 140 is higher or lower than that of upper surface 110 of cutting insert 100. When cutting insert 100 is fixed into the holder for cutting tool, then a clamping screw or a clamping lever can be inserted into boss 140. It is also possible to use a clamp having a specific shape to hold cutting insert 100 in the holder for cutting tool without forming circle opening 109 at the center of cutting insert 100.

FIG. 3 is a sectional view taken along the line B—B of FIG. 1. Referring to FIG. 3, a main cutting land surface 106b extends from second side surface 108 and comprises a smooth curved surface. At this time, in order to avoid the interference between corner cutting edge 101 and the workpiece such as ferrous or nonferrous metal, second side surface 108 extends upwardly and slants outwardly from lower surface 111 to main cutting edges 103,105. A central chip groove 124b having the shape of valley extends from main cutting edge land surface 106b toward bisecting line 150(referred to FIG. 1). Upper surface 110b comprises ridges 112b and valleys 114b which continuously meet with each other. The altitude of upper surface 110b is lower than those of a corner cutting edge 110b and a main cutting edge 105b.

Figure 4A:
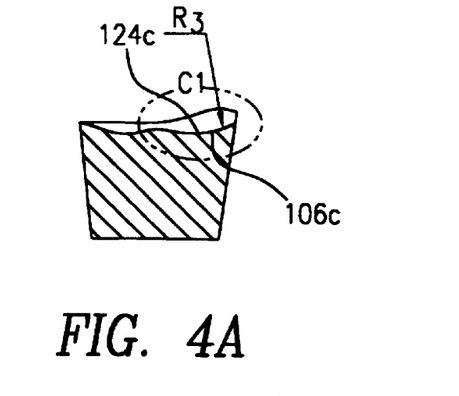
FIG. 4A is a sectional view taken along the line C—C of FIG. 1.
Figure 4B:
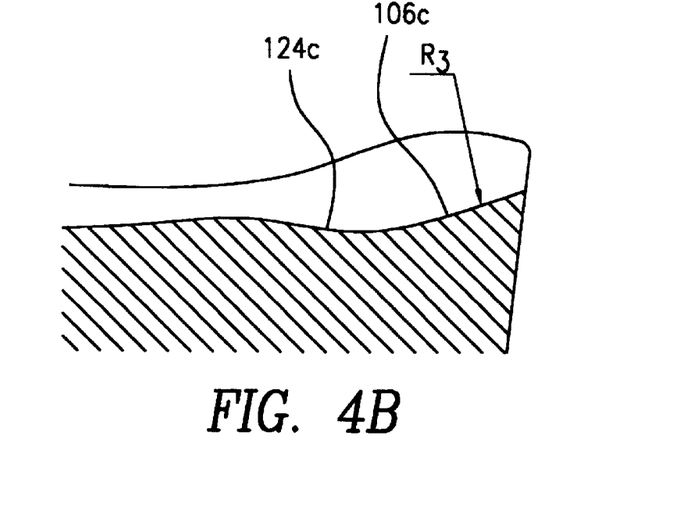
FIG. 4B is an enlarged view of "C1" section illustrated in FIG. 4A.

FIG. 4A is a sectional view taken along the line C—C of FIG. 1, and FIG. 4B is an enlarged view of "C1" section illustrated in FIG. 4A.

Referring to FIGS. 1, 4A and 4B, ridge 112 and valley 114 extend from a sloping main cutting edge land surface 106c adjacent to main cutting edge 105 toward bisecting line 150(referred to FIG. 1). At this time, as best seen in FIG. 1, ridge 112 and valley 114 form a predetermined angle(θ), that is +10° to −20°, preferably −15° to −5° with a line 154 perpendicular to main cutting edge 105. Further, ridge 112 and valley 114 of first region (110H₁) are mirror symmetrical with respect to ridge 112 and valley 114 of second region (110H₂) along bisecting line (150).

As shown in FIGS. 4A and 4B, main cutting edge land surface 106c comprises a smooth curved surface meeting with a chip groove 124c. At this time, a radius of curvature (R₃) of the curved surface is within the range of from 5 to 15 mm.

Figure 5A:
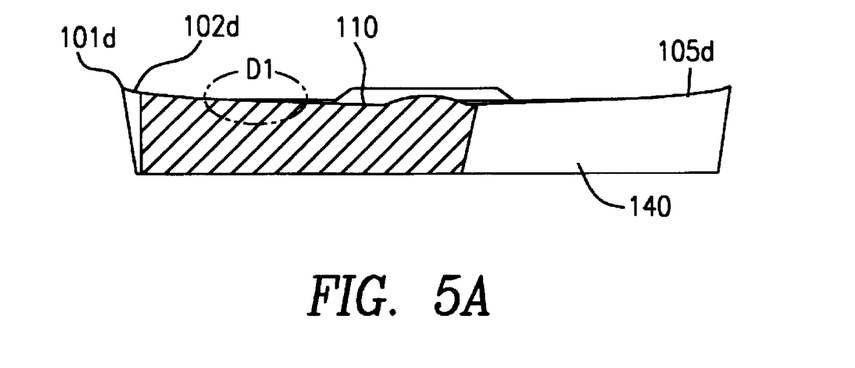
FIG. 5A is a sectional view taken along the line D—D of FIG. 1.
Figure 5B:
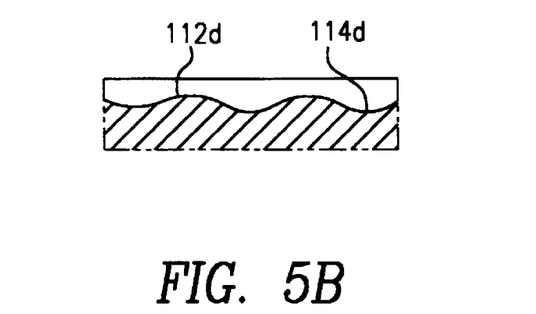
FIG. 5B is an enlarged view of "D1" section illustrated in FIG. 5A.

FIG. 5A is a sectional view taken along the line D—D of FIG. 1, and FIG. 5B is an enlarged view of "D1" section illustrated in FIG. 5A.

Referring to FIGS. 5A and 5B, upper surface 110 comprises ridges 112d and valleys 114d. The uneven surface comprising ridges 112d and the valleys, that are central chip grooves 114d, has a radius of curvature of between 0.1 and 2.5 mm.

Figure 6A:
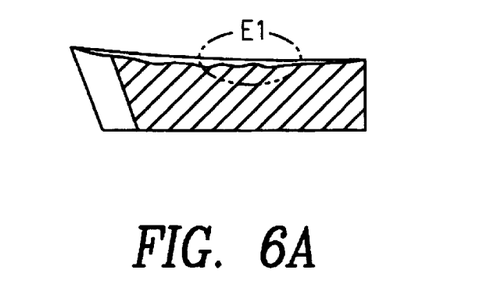
FIG. 6A is a sectional view taken along the line E—E of FIG. 1.
Figure 6B:
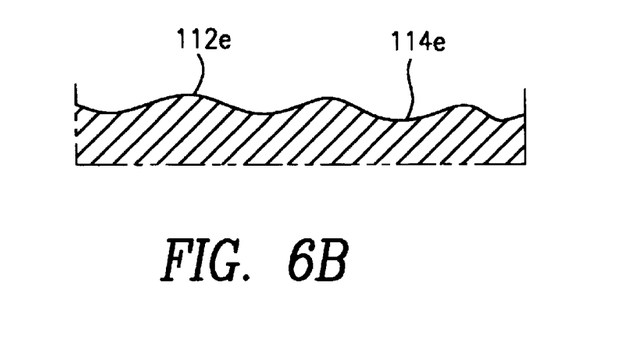
FIG. 6B is an enlarged view of "E1" section illustrated in FIG. 6A.

FIG. 6A is a sectional view taken along the line E—E of FIG. 1, and FIG. 6B is an enlarged view of "E1" section illustrated in FIG. 6A.

Referring to FIGS. 6A and 6B, upper surface 110 is consisted of ridges 112e and valleys, that are central chip grooves 114e. The uneven surface comprising ridges 112e and central chip grooves 114e extends toward bisecting line 150(referred to FIG. 1). At this time, radius of curvature of ridges 112e and central chip grooves 114e is within the range of from 0.1 to 2.5 mm.

Figure 7:
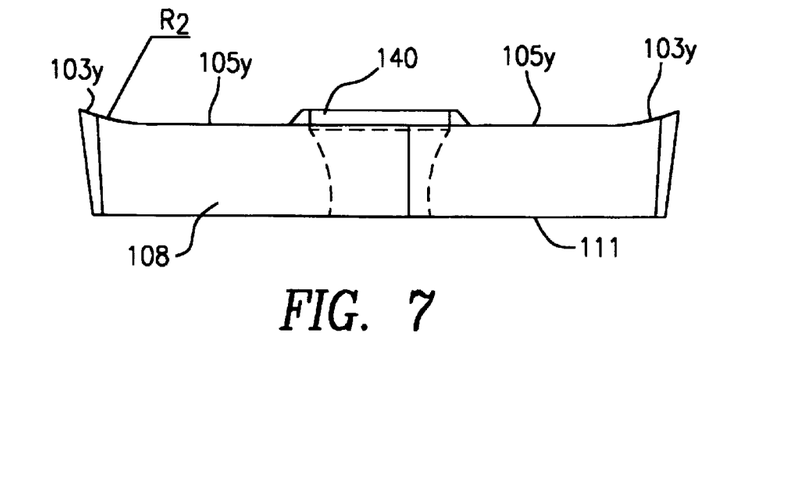
FIG. 7 is a front view taken in the direction of the arrow "Y" of FIG. 1.

FIG. 7 is a front view taken in the direction of the arrow "Y" of FIG. 1.

Referring to FIG. 7, when a person see cutting insert 100 in the direction of the arrow "Y", then the main cutting edge seems to be a generally curved line. The main cutting edge is consisted of at least one curved line 103y and at least one straight line 105y meeting with each other in an adjoining relationship. Preferably, curved line 103y is a part of circle or ellipse. A radius of curvature ($R_2$) of curved line 103y is within the range of from 1 to 50 mm, preferably 3 to 20 mm.

Figure 8:
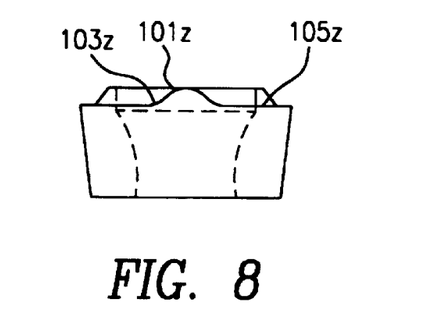
FIG. 8 is a front view taken in the direction of the arrow "Z" of FIG. 1.

FIG. 8 is a front view taken in the direction of the arrow "Z" of FIG. 1.

Referring to FIG. 8, when a person see cutting insert 100 in the direction of the arrow "Z", then the main cutting edge portion seems to be a curved line. The main cutting edge portion is consisted of at least one main cutting edge 103z, which is a curved line, and at least one main cutting edge 105z, which is a straight one, main cutting edge 103z and 105z meeting with each other in an adjoining relationship.

Figure 9:
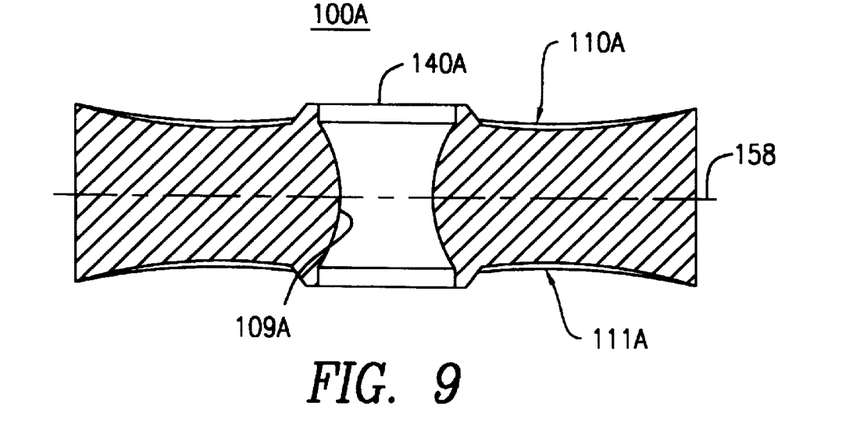
FIG. 9 is a longitudinal sectional view of a cutting insert having chip breakers provided on both surfaces thereof according to a preferred second embodiment of the present invention.

FIG. 9 is a longitudinal sectional view of a cutting insert having chip breakers provided on both surfaces thereof according to a preferred second embodiment of the present invention.

A cutting insert 100A according to the preferred second embodiment of the present invention is formed by improving cutting insert 100 according to the preferred first embodiment of the present invention considering the economical efficiency. That is, cutting insert 100A has the same constitution as cutting insert 100 according to the preferred first embodiment of the present invention, except that it has same chip breakers on an upper surface 110A and a lower surface 111A thereof in order to cut ferrous or nonferrous metals selectively using upper surface 110A and lower surface 111A. Accordingly, descriptions of constitutional elements which are identical to the constitutional elements of cutting insert 100 according to the preferred first embodiment of the present invention will be omitted.

In the same manner as that of the first embodiment of the present invention, on upper surface 110A and lower surface 111A, cutting insert 100A includes main cutting edge portions comprising main cutting edges and sloping main cutting edge land surfaces extending downwards from the main cutting edges toward bisecting line 150. At this time, the altitudes of upper surface 110A and lower surface 111A are lower than those of the corner cutting edges and the main cutting edges.

Further, at least one ridge and valley are formed on upper surface 110A and lower surface 111A of cutting insert 100A, and thereby at least one corner chip groove and a plurality of central chip groove are provided thereon. In addition, a circle opening 109A is formed through the center of cutting insert 100A. A boss 140A having an upper portion and a lower portion is installed in circle opening 109A.

The chip breaker on upper surface 110A is mirror symmetrical with respect to the chip breaker on lower surface 111A along a horizontal bisector (158) of cutting insert (110). Boss 140A provides a means whereby a holder for cutting tool (not shown) can be fitted into boss 140A to secure cutting insert 100A to the holder for cutting tool.

Figure 10:
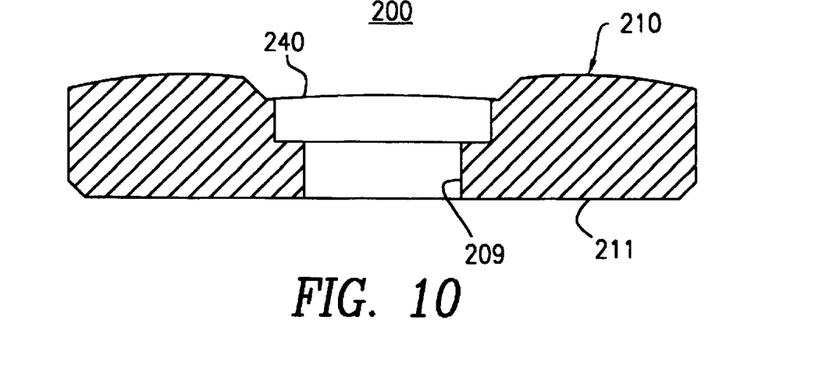
FIG. 10 is a longitudinal sectional view of a shim which has used with the cutting insert as shown in FIG. 9.

FIG. 10 is a longitudinal sectional view of a shim which has used with the cutting insert as shown in FIG. 9.

Referring to FIG. 10, a shim 200 according to the present invention provides a means whereby cutting insert 100A is firmly supported by shim 200 and secured to a holder for cutting tool(not shown) during the use of cutting insert 100A.

For this purpose, an upper surface 210 of shim 200 has a shape corresponding to that of a lower surface 111A of cutting insert 100A. An opening 209 is formed through the center of shim 200. A boss 240 is installed in opening 209A. Boss 240 provides a means whereby a holder for cutting tool (not shown) can be fitted into boss 240 to secure cutting insert 100A to the holder for cutting tool. Since a lower surface 211 of shim 200 is a plane in figure, it firmly supports shim 200 during the fixation of shim 200 into the holder for cutting tool.

Therefore, when cutting insert 100A according to the present invention is positioned onto upper surface 210 of shim 200 fixed in the holder for cutting tool, then lower surface 110A having the chip breaker is exactly fitted with upper surface 210 of shim 200. Under this state, cutting insert 100A is firmly clamped by means of a clamping screw or an additional clamp for pressing and fixing upper surface 210 of cutting insert 100A.

As described above, cutting inserts 100, 100A according to the present invention have the specific chip breakers, the chip breakers being given by corner cutting edge 101 and main cutting edges 103,105, which are smoothly curved at a certain radius of curvature, corner cutting edge land surface 102 and main cutting edge land surfaces 104,106, upper surfaces 110,110A, which have uneven shapes and are curved at a certain radius of curvature in order to meet with corner cutting edge 101, main cutting edges 103,105, corner cutting edge land surface 102 and main cutting edge land surfaces 104,106.

Accordingly, if cutting inserts 100,100A according to the present invention are used to cut ferrous or nonferrous metals, the resistance to chip flow is minimized due to the shape of the uneven surface extending among cutting land surfaces 102,104,106, chip grooves 122,124 and upper surfaces 110,110A. Further, since the radius of curvature of the cut chips is optimized, the cutting resistance being applied to cutting edges 101,103,105 is minimized. In addition, since the cutting force is equally distributed to individual cutting edges, the strength of the cutting edge is enhanced.

Further, since the chip breakers of cutting insert 100,100A according to the present invention are produced in a pressing molding operation using a mold and in a sintering operation, there is no necessity for performing any post-processing to the chip breakers. As a result, it is possible to provide a uniform product of which a quality is maintained within a lot or between lots. In addition, since the chip breakers of cutting insert 100,100A undergo in the honing process, buffing process or surface hardening process, the lubricity of the chip breakers is increased and thereby the cutting resistance is minimized. Accordingly, cutting insert 100, 100A can have wear resistance and wear toughness better than those of cutting insert 10 according to the prior art. Further, the surface roughness of worked materials is highly enhanced due to the remarkable decrease of the adhesion phenomenon, etc.

Finally, due to the characteristic between main cutting edge land surfaces 104,106 and the surface of the cut chip, the radius of curvature of the cut chip is optimized to be corresponded with a cutting condition. As a result, cutting insert 100,100A can smoothly remove the cut chip as compared with cutting insert 10 according to the prior art. Accordingly, the wear resistance and the wear toughness of cutting insert 100,100A are enhanced. The surface finish of worked materials is also enhanced.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A cutting insert (100), comprising:
    an upper surface (110) having a chip breaker formed in a pressure molding operation using a mold and in a sintering operation, said upper surface (110) including at least one ridge (112) and valley (114) constituting a non uniform curved surface;
    a lower surface (111) formed as a plane, said lower surface (111) being firmly fixed on a holder for cutting tool and supporting the cutting insert (100) when mounting the cutting insert (100) in the holder for cutting tool;
    at least one corner cutting edge portion formed at corners of the cutting insert (100), said corner cutting edge portion extending from a first side face (107) of the cutting insert (100), a curved surface of said corner cutting edge portion comprising a corner cutting edge (101), a curved corner cutting edge land surface (102), a curved corner chip groove (122) and a curved surface extending from a first valley (114$a_1$) closed by a curved surface (122$a$) of said corner chip groove (122) to an apex of a first ridge (112$a_1$) neighboring to the first valley (114$a_1$), in which a center of the curved surface of said corner cutting edge portion is projected on a plane along a bisecting line (150) going from a center of said corner cutting edge (101) toward a center(CP) of an opening (109) formed through a center portion of the cutting insert (100), and a radius of curvature ($R_1$) of a curved surface (102$a$) of said corner cutting edge land surface (102) is within the range of from 1 to 30 mm; and
    main cutting edge portions including main cutting edges (103,105) and sloping main cutting edge land surfaces (104,106) extending downwards from said main cutting edges (103,105) toward the bisecting line (150), said main cutting edges (103,105) meeting with said corner cutting edge (101) in an adjoining relationship and forming a corner included angle ($\gamma$) of between 35° and 180° therebetween, in which said main cutting edge land surfaces (104,106) comprise at least one curved surface extending from a second side face (108) of the cutting insert (100) and connecting said ridge (112$b$) and said valley (114$b$) with each other, a radius of curvature ($R_3$) of a curved surface comprising said main cutting edge land surfaces (104,106) and said ridge (112$b$) or comprising said main cutting edge land surfaces (104,106) and said valley (114$b$) is within the range of from 5 to 15 mm, said main cutting edges (103,105) comprises at least one curved line (103$y$) and at least one straight line (105$y$) which smoothly meet with each other in an adjoining relationship, the curved line (103$y$) extends downwards from said corner cutting edge (101) toward the center portion of the cutting insert (100), and a radius of curvature ($R_2$) of the curved line (103$y$) is within the range of from 3 to 20 mm.

2. A cutting insert as in claim 1, further comprising a boss (140) installed in the opening(109), a clamping screw or a clamping lever of the holder for cutting tool being easily inserted into said boss(140) when mounting the cutting insert (100) in the holder for cutting tool.

3. A cutting insert as in claim 1, wherein said ridge (112) and said valley (114) constitute said corner chip groove (122) and a plurality of central chip grooves (124), said ridge (112) and said valley (114) extend between one main cutting edge land surfaces (104,106) and the other main cutting edge land surfaces (104,106) which are opposite with respect to each other along the bisecting line (150), in which the bisecting line (150) divides said upper surface (110) into a first region (110$H_1$) and a second region (110$H_2$) so that the first region (110$H_1$) is mirror symmetrical with respect to the second region (110$H_2$) along the bisecting line (150), and a radius($R_4$) of curvature of said ridge (112$a_1$) and a radius ($R_5$) of curvature of said valley (114$a_1$) are within the range of from 0.1 to 2.5 mm.

4. A cutting insert as in claim 3, wherein a uneven surface comprising said ridge (112) and said valley (114) extends downwards from said sloping main cutting edge land surface (106) toward the bisecting line (150) with forming an angle($\theta$) of between −20° and +10° with regard to a line (154) perpendicular to said main cutting edge(105).

5. A cutting insert as in claim 1, wherein said first side surface (107) of the cutting insert (100) extends upwardly and slants outwardly from said lower surface (111) to said corner cutting edge (101), and said second side surface (108) of the cutting insert (100) extends upwardly and slants outwardly from said lower surface (111) to said main cutting edges (103,105).

6. A cutting insert as in claim 1, wherein the bisecting line (150) is parallel with said lower surface (111), an angle ($\alpha$) formed by a tangential line (155) connecting said ridges (112$a_1$,112$a$) with each other and the bisecting line (150) is of between −10° and +10°.

7. A cutting insert (100), comprising:
    an upper surface (110) having a first chip breaker formed in a pressure molding operation using a mold and in a sintering operation, said upper surface (110) including at least one ridge (112) and valley (114) constituting a non uniform curved surface;
    a lower surface (111) having a second chip breaker formed in a pressure molding operation using a mold and in a sintering operation, the second chip breaker being mirror symmetrical with respect to the first chip breaker along a horizontal bisector (158) of the cutting insert (110), said lower surface including al least one ridge and valley constituting a non uniform curved surface;
    at least one corner cutting edge portion formed at corners of the cutting insert (100), said corner cutting edge portion extending from a first side face (107) of the cutting insert (100), a curved surface of said corner cutting edge portion comprising a corner cutting edge (101), a curved corner cutting edge land surface (102), a curved corner chip groove (122) and a curved surface extending from a first valley (114$a_1$) closed by a curved surface (122$a$) of said corner chip groove (122) to an apex of a first ridge (112a₁) neighboring to the first valley (114a₁), in which a center of the curved surface of said corner cutting edge portion is projected on a plane along a bisecting line (150) going from a center of said corner cutting edge (101) toward a center(CP) of an opening (109) formed through a center portion of the cutting insert (100), and a radius of curvature (R₁) of a curved surface (102a) of said corner cutting edge land surface (102) is within the range of from 1 to 30 mm; and main cutting edge portions including main cutting edges (103,105) and sloping main cutting edge land surfaces (104,106) extending downwards from said main cutting edges (103,105) toward the bisecting line (150), said main cutting edges (103,105) meeting with said corner cutting edge (101) in an adjoining relationship and forming a corner included angle (γ) of between 35° and 180° therebetween, in which said main cutting edge land surfaces (104,106) comprise at least one curved surface extending from a second side face (108) of the cutting insert (100) and connecting said ridge (112b) and said valley (114b) with each other, a radius of curvature (R₃) of a curved surface comprising said main cutting edge land surfaces (104,106) and said ridge (112b) or comprising said main cutting edge land surfaces (104,106) and said valley (114b) is within the range of from 5 to 15 mm, said main cutting edges (103,105) comprises at least one curved line (103y) and at least one straight line (105y) which smoothly meet with each other in an adjoining relationship, the curved line (103y) extends downwards from said corner cutting edge (101) toward the center portion of the cutting insert (100), and a radius of curvature (R₂) of the curved line (103y) is within the range of from 3 to 20 mm.

8. A cutting insert as in claim 7, further comprising a boss (140) installed in the opening (109), a clamping screw or a clamping lever of a holder for cutting tool being easily inserted into said boss (140) when mounting the cutting insert (100) in the holder for cutting tool.

9. A cutting insert as in claim 7, wherein said ridge(112) and said valley (114) constitute said corner chip groove(122) and a plurality of central chip grooves(124), said ridge (112) and said valley (114) extend between one main cutting edge land surfaces (104,106) and the other main cutting edge land surfaces (104,106) which are opposite with respect to each other along the bisecting line (150), in which the bisecting line (150) divides said upper surface (110) into a first region (110H₁) and a second region (110H₂) so that the first region (110H₁) is mirror symmetrical with respect to the second region (110H₂) along the bisecting line (150), and a radius (R₄) of curvature of said ridge (112a₁) and a radius (R₅) of curvature of said valley (114a₁) are within the range of from 0.1 to 2.5 mm.

10. A cutting insert (100), comprising:
an upper surface (110) having a chip breaker formed in a pressure molding operation using a mold and in a sintering operation, said upper surface (110) including at least one ridge (112) and valley (114) constituting a non uniform curved surface;
a lower surface (111) formed as a plane, said lower surface (111) being firmly fixed on a holder for cutting tool and supporting the cutting insert (100) when mounting the cutting insert (100) in the holder for cutting tool;
at least one corner cutting edge portion formed at corners of the cutting insert (100), said corner cutting edge portion extending from a first side face (107) of the cutting insert (100), a curved surface of said corner cutting edge portion comprising a corner cutting edge (101), a curved corner cutting edge land surface (102), a curved corner chip groove (122) and a curved surface extending from a first valley (114a₁) closed by a curved surface (122a) of said corner chip groove (122) to an apex of a first ridge (112a₁) neighboring to the first valley (114a₁), in which a center of the curved surface of said corner cutting edge portion is projected on a plane along a bisecting line (150) going from a center of said corner cutting edge (101) toward a center(CP) of an opening (109) formed through a center portion of the cutting insert (100), and a radius of curvature (R₁) of a curved surface (102a) of said corner cutting edge land surface (102) is within the range of from 1 to 30 mm; and main cutting edge portions including main cutting edges (103,105) and sloping main cutting edge land surfaces (104,106) extending downwards from said main cutting edges (103,105) toward the bisecting line (150), said main cutting edges (103,105) meeting with said corner cutting edge (101) in an adjoining relationship and forming a corner included angle (γ) of between 35° and 180° therebetween, said main cutting edges (103,105) comprising at least one curved line (103y) and at least one straight line (105y), the curved line (103y) and the straight line (105y) smoothly meeting with each other in an adjoining relationship, the curved line (103y) extending downwards from said corner cutting edge (101) toward the center portion of the cutting insert (100), in which said main cutting edge land surfaces (104,106) comprise at least one curved surface extending from a second side face (108) of the cutting insert (100) and connecting said ridge (112b) and said valley (114b) with each other, a radius of curvature (R₃) of a curved surface comprising said main cutting edge land surfaces (104,106) and said ridge (112b) or comprising said main cutting edge land surfaces (104,106) and said valley (114b) is within the range of from 5 to 15 mm, and a radius of curvature (R₂) of the curved line (103y) is within the range of from 3 to 20 mm; and a boss (140) installed in the opening (109), a clamping screw or a clamping lever of the holder for cutting tool being easily inserted into said boss (140) when mounting the cutting insert (100) in the holder for cutting tool.

11. A cutting insert as in claim 10, wherein said ridge(112) and said valley (114) constitute said corner chip groove (122) and a plurality of central chip grooves (124), said ridge (112) and said valley (114) extend between one main cutting edge land surfaces (104,106) and the other main cutting edge land surfaces (104,106) which are opposite with respect to each other along the bisecting line (150), in which the bisecting line (150) divides said upper surface (110) into a first region (110H₁) and a second region (110H₂) so that the first region (110H₁) is mirror symmetrical with respect to the second region (110H₂) along the bisecting line (150), and a radius(R₄) of curvature of said ridge (112a₁) and a radius (R₅) of curvature of said valley (114a₁) are within the range of from 0.1 to 2.5 mm.

12. A cutting insert as in claim 11, wherein a uneven surface comprising said ridge (112) and said valley (114) extends downwards from said sloping main cutting edge land surface (106) toward the bisecting line (150) with forming an angle(θ) of between −20° and +10° with regard to a line(154) perpendicular to said main cutting edge(105).

13. A cutting insert as in claim 10, wherein said first side surface (107) of the cutting insert (100) extends upwardly and slants outwardly from said lower surface (111) to said corner cutting edge (101), and said second side surface (108)

of the cutting insert (100) extends upwardly and slants outwardly from said lower surface (111) to said main cutting edges (103,105).

14. A cutting insert as in claim 10, wherein the bisecting line (150) is parallel with said lower surface (111), an angle ($\alpha$) formed by a tangential line (155) connecting said ridges (112$a_1$, 112$a$) with each other and the bisecting line (150) is of between $-10°$ and $+10°$.

* * * * *